United States Patent
Imamura et al.

(10) Patent No.: US 7,995,694 B2
(45) Date of Patent: Aug. 9, 2011

(54) SYSTEMS AND METHODS FOR DETECTING A SPECIFIC TIMING FROM A SYNCHRONIZATION CHANNEL

(75) Inventors: Kimihiko Imamura, Vancouver, WA (US); Prem L. Sood, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 759 days.

(21) Appl. No.: 11/828,058

(22) Filed: Jul. 25, 2007

(65) Prior Publication Data

US 2008/0232528 A1    Sep. 25, 2008

Related U.S. Application Data

(60) Provisional application No. 60/895,687, filed on Mar. 19, 2007.

(51) Int. Cl.
 *H04L 7/00* (2006.01)
(52) U.S. Cl. ........ 375/365; 375/362; 375/260; 375/145; 375/149; 375/368; 370/509; 370/510; 370/512
(58) Field of Classification Search .................. 375/260, 375/365, 362, 368, 145, 149; 370/509, 510, 370/512
See application file for complete search history.

(56) References Cited

U.S. PATENT DOCUMENTS

| | | | |
|---|---|---|---|
| 6,834,046 B1 | 12/2004 | Hosur et al. | |
| 7,110,782 B2 | 9/2006 | Yamaguchi | |
| 2003/0153275 A1 | 8/2003 | Oh et al. | |
| 2005/0078771 A1 | 4/2005 | Oh et al. | |
| 2005/0163238 A1* | 7/2005 | Fujii | 375/260 |
| 2007/0041348 A1 | 2/2007 | Kwun et al. | |
| 2007/0098100 A1* | 5/2007 | Charbit et al. | 375/260 |

FOREIGN PATENT DOCUMENTS

| | | |
|---|---|---|
| EP | 1091507 | 4/2001 |
| WO | 2006072967 | 7/2006 |

OTHER PUBLICATIONS

3GPP TSG-RAN Submission R2-070513, "SFN Synchronization without BCH bits for LTE," Feb. 2007.
3GPP TSG-RAN Submission R1-063431, "Initial Cell Search: Analysis and Simulations," Nov. 2006.

* cited by examiner

*Primary Examiner* — Phuong Phu
(74) *Attorney, Agent, or Firm* — Austin Rapp & Hardman

(57) ABSTRACT

A method for detecting a specific timing from a synchronization channel is described. A signal with a known sequence is received. Two or more correlation values between the received signal and the known sequence are calculated at two or more positions. The two or more correlation values are compared. A determination is made whether the position of the known sequence has been shifted based on the comparison. A specific timing of a synchronization channel is detected based on the determination.

11 Claims, 12 Drawing Sheets

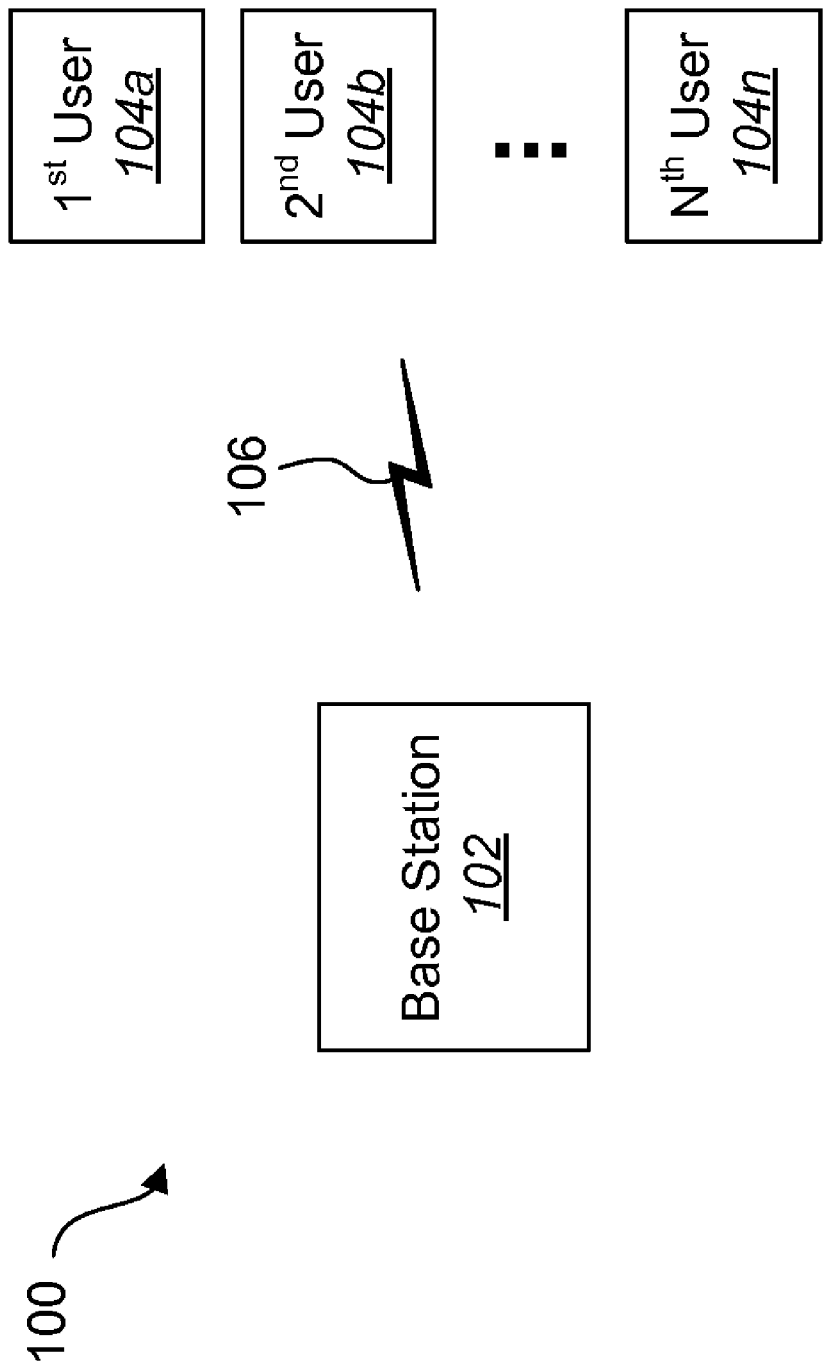

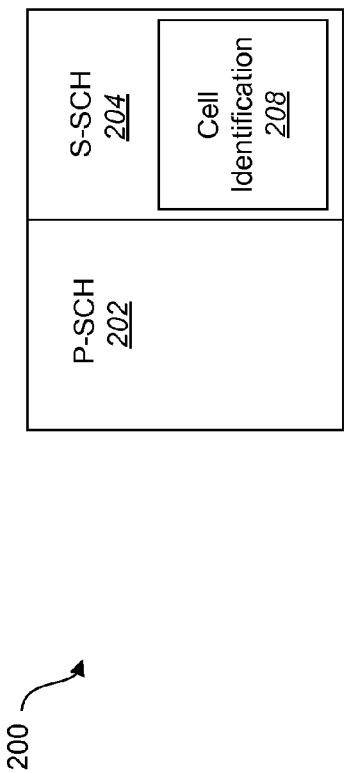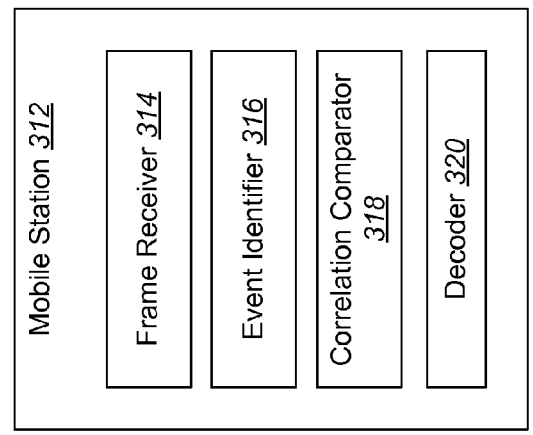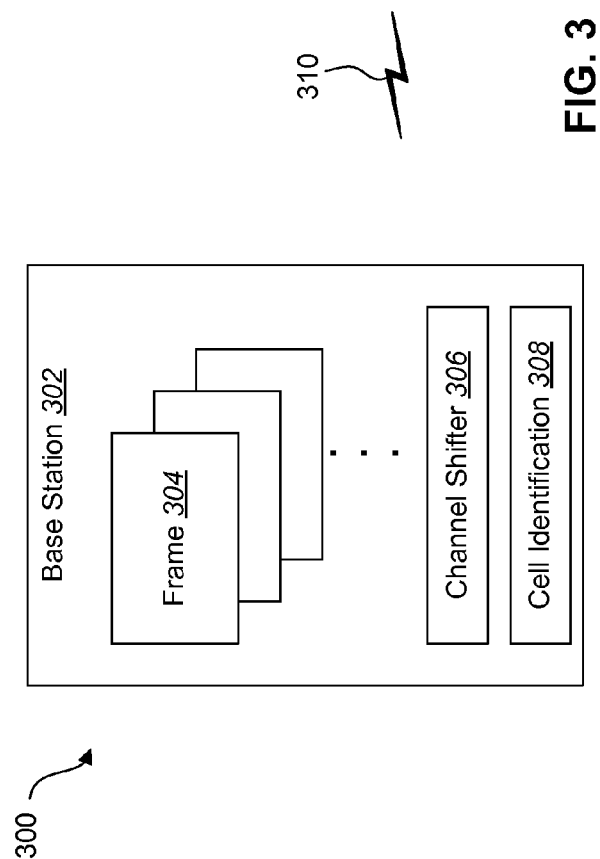

SYSTEMS AND METHODS FOR DETECTING A SPECIFIC TIMING FROM A SYNCHRONIZATION CHANNEL

RELATED APPLICATIONS

This application is related to and claims priority from U.S. Provisional Patent Application Ser. No. 60/895,687 filed Mar. 19, 2007, for SYSTEMS AND METHODS FOR DETECTING A SPECIFIC TIMING, with inventors Kimihiko Imamura and Prem L. Sood, which is incorporated herein by reference.

TECHNICAL FIELD

The present invention relates generally to data communications and wireless data communications. More specifically, the present invention relates to systems and methods for detecting a specific timing from a synchronization channel.

BACKGROUND

A wireless communication system typically includes a base station in wireless communication with a plurality of user devices (which may also be referred to as mobile stations, user equipment, subscriber units, access terminals, terminals, etc.). The base station transmits data to the user devices over a radio frequency (RF) communication channel. The term "downlink" refers to transmission from a base station to a user device, while the term "uplink" refers to transmission from a user device to a base station.

The $3^{rd}$ Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union.

Wireless communications systems (e.g., Time Division Multiple Access (TDMA), Orthogonal Frequency-Division Multiplexing (OFDM) and Wideband Code Division Multiple Access (WCDMA)) usually calculate an estimation of a channel impulse response between the antennas of a user device and the antennas of a base station for coherent receiving. Channel estimation may involve transmitting known reference signals that are multiplexed with the data. Reference signals may include a single frequency and are transmitted over the communication systems for supervisory, control, equalization, continuity, synchronization, etc. Wireless communication systems may include one or more mobile stations and one or more base stations that each transmits a reference signal. In addition to reference signals, data may be transmitted between a base station and a mobile station. Data may be included in one or more frames of varying lengths. The occurrence of certain events may be detected by a receiver. Certain events may be indicated by the position of certain sequences transmitted within the frames. In particular, a specific timing may indicate the occurrence of an event. As such, benefits may be realized from systems and methods for detecting a specific timing from a synchronization channel.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 1 illustrates an exemplary wireless communication system in which embodiments may be practiced;

FIG. 2 is illustrates one embodiment of a synchronization channel (SCH);

FIG. 3 is a block diagram further illustrating an exemplary wireless communication system;

DETAILED DESCRIPTION

Figure 4:
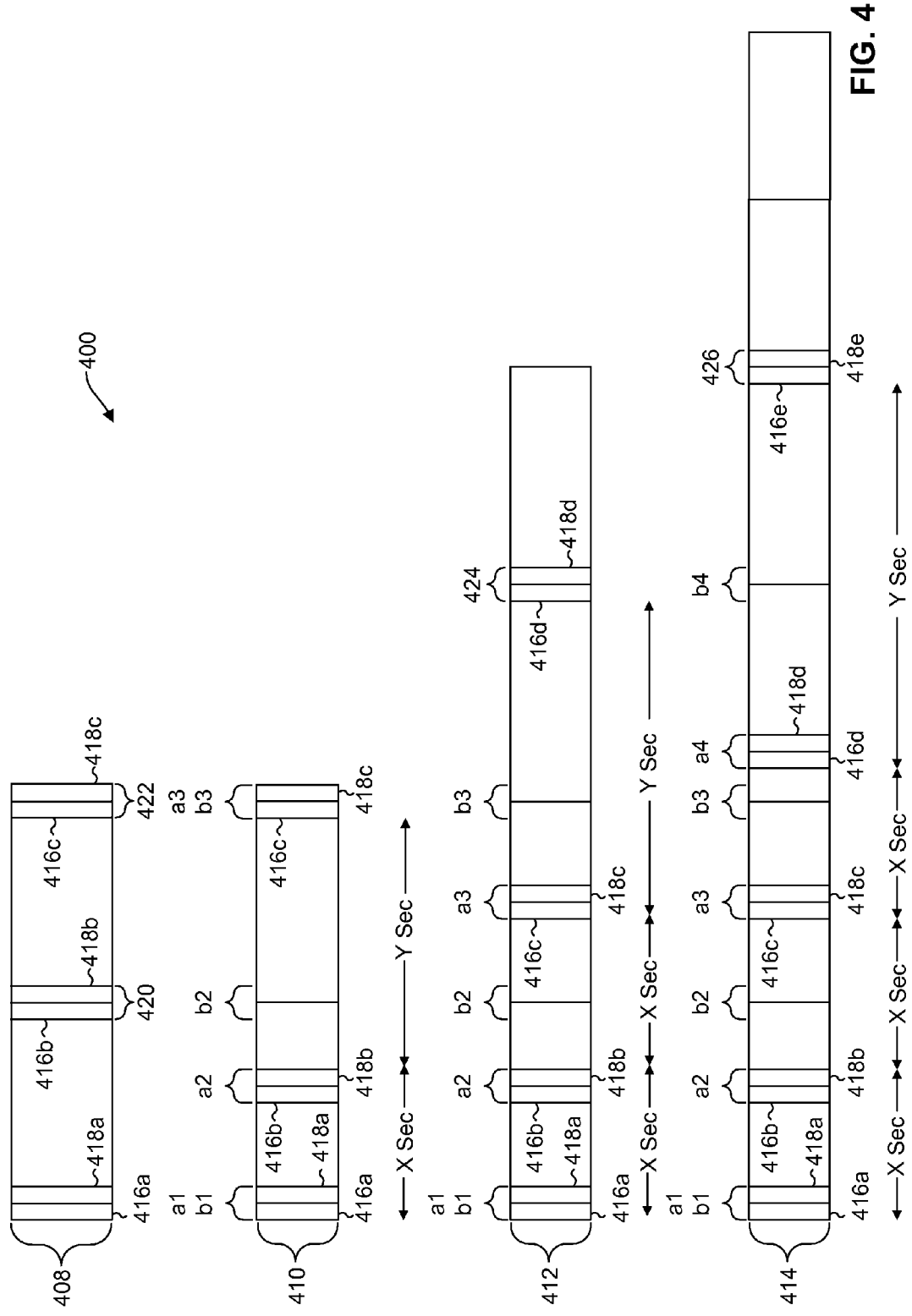
FIG. 4 illustrates several embodiments of one or more radio frames that include a plurality of SCH channels.

A method for detecting a specific timing from a synchronization channel is described. A signal with a known sequence is received. Two or more correlation values between the received signal and the known sequence are calculated at two or more positions. The two or more correlation values are compared. A determination is made whether the position of the known sequence has been shifted based on the comparison. A specific timing of a synchronization channel is detected based on the determination.

In one embodiment, the known sequence is a primary-synchronization sequence within a synchronization channel. In another embodiment, the known sequence is a secondary-synchronization sequence within a synchronization channel. A determination may be made whether the timing of the known sequence before the known sequence is received. The timing of the known sequence may be determined through a prior cell-search.

A radio frame with the signal and the known sequence may be received. The specific timing may be a superframe boundary. The superframe may comprise 4096 radio frames.

A method for detecting a specific timing from a synchronization channel is described. At least two channels are received at different time periods. A sequence is decoded from each of the received channels. An identification part is decoded from each decoded sequence. A determination is made whether the identification part of each decoded sequence was decoded correctly. A specific timing of a synchronization channel is detected based on the determination.

The synchronization channel may comprise a secondary-synchronization sequence. An identification of a cell encoded within the secondary-synchronization sequence may be received. The identification of a cell may be decoded from the secondary-synchronization sequence. A determination is made whether the identification of a cell is decoded correctly. A specific timing is detected based on the determination.

The synchronization channel may comprise a primary-synchronization sequence. An identification of a cell encoded within the primary-synchronization sequence may be received. The identification of a cell may be decoded from the primary-synchronization sequence. A determination is made whether the identification of a cell is decoded correctly. A specific timing may be detected based on the determination.

A device configured to detect a specific timing from a synchronization channel is also described. The device includes a processor and memory in electronic communication with the processor. Instructions are stored in the memory. A signal with a known sequence is received. Two or more correlation values between the received signal and the known sequence are calculated at two or more positions. The two or more correlation values are compared. A determination is made whether the position of the known sequence has been shifted based on the comparison. A specific timing of a synchronization channel is detected based on the determination.

A computer-readable medium comprising executable instructions for detecting a specific timing from a synchronization channel is also described. A signal with a known sequence is received. Two or more correlation values between the received signal and the known sequence are calculated at two or more positions. The two or more correlation values are compared. A determination is made whether the position of the known sequence has been shifted based on the comparison. A specific timing of a synchronization channel is detected based on the determination.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The $3^{rd}$ Generation Partnership Project (3GPP) Universal Mobile Telecommunications System (UMTS) Wideband Code Division Multiple Access (WCDMA) standards use a System-Frame Numbering scheme. In the present application, the System-Frame Numbering scheme will also be referred to as a Super-Frame Number (SFN). In one embodiment, the SFN is used to control and schedule various events and activities that are performed on a mobile station on an infrequent basis. For example, the SFN schedules events and activities that occur less frequently than a frame length of 10 milliseconds (ms) that is transmitted from a base station. The SFN also enables power savings for the mobile station by causing the mobile station to sleep for a long period of time and then waking up the mobile station to perform these infrequent events and activities. An example may include the mobile station monitoring one or more paging channels during an idle mode.

Figure 13:
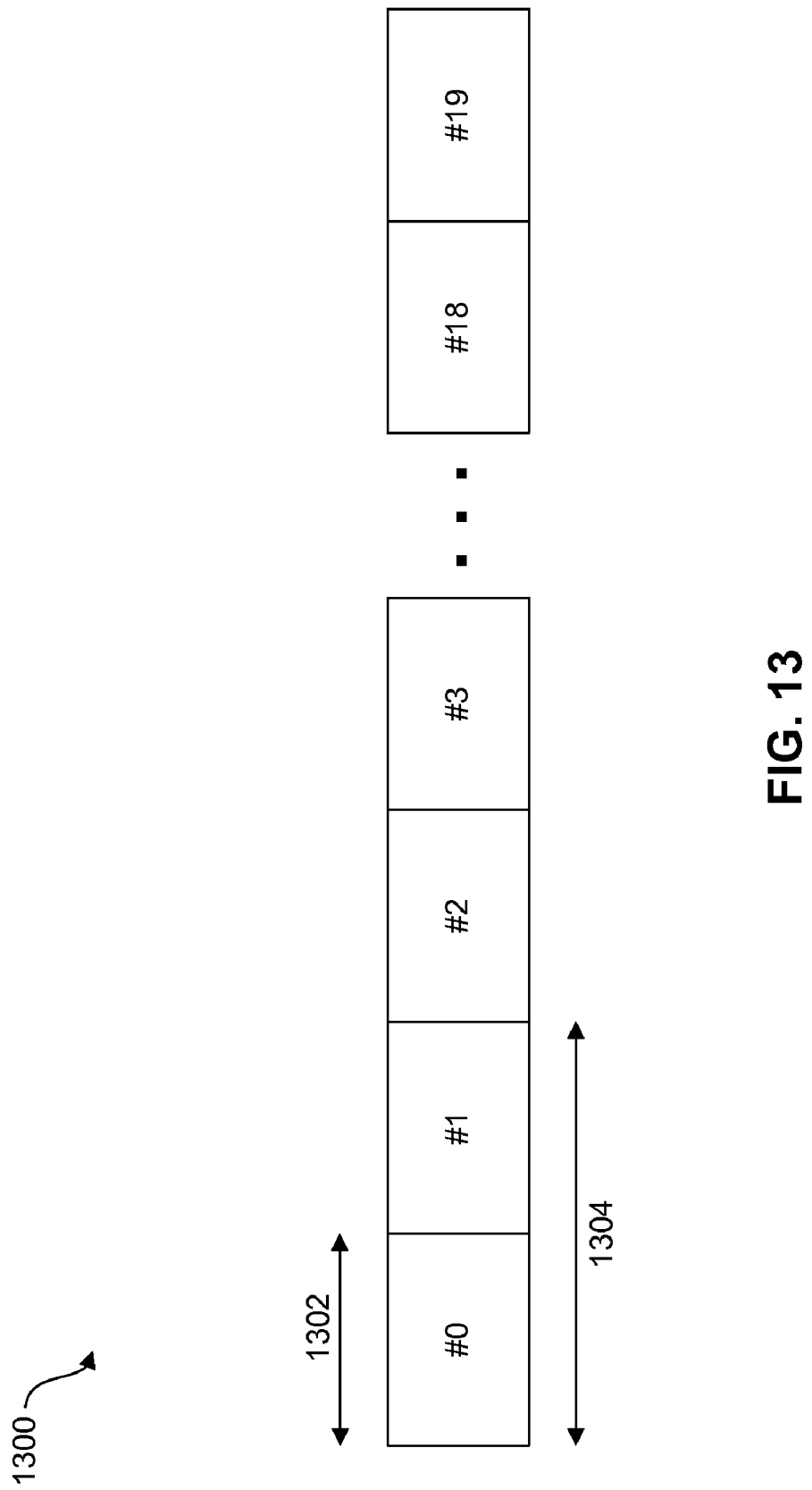
FIG. 13 illustrates one embodiment of a radio frame.

Currently, a Long Term Evolution (LTE of the 3GPP System, also called an LTE System) radio frame (herein referred to as a frame) has a length of 10 ms. FIG. 13 is one embodiment of an LTE radio frame 1300. The frame 1300 may include ten subframes 1304 with each subframe 1304 having a length of 1 ms. Each subframe 1304 may include two slots 1302 with a length of 0.5 ms each. Each of the two slots 1302 may include seven symbols, thus each subframe 1304 includes fourteen symbols and each frame 1300 of 10 ms includes 140 symbols. As such, each half frame includes seventy symbols.

In one embodiment, each of the LTE frames 1300 carries a synchronization channel (SCH) which includes 2 synch symbols. The 2 synch symbols may be a primary-SCH (P-SCH) and a secondary-SCH (S-SCH). Nominally, this SCH symbol-pair of 1 P-SCH and 1 S-SCH (referred to herein as a "P-SCH, S-SCH pair") repeats twice every frame of 10 ms, i.e. it repeats every 5 ms. However, the SCH (and thus the P-SCH, SCH pair) may be shifted so it does not repeat every 5 ms.

A base station with a current 3GPP system may frequently transmit an SFN counter value at regular intervals to a mobile station on a cell broadcast channel (BCH). The SFN counter value may assist the mobile station to sync to an SFN corresponding to the cell of the transmitting base station. The transmitted SFN counter value increments by 1 for each frame of 10 ms and recycles to 0 after a count of 4095 frames.

In other words, 4096 frames may equal one Superframe. Constant and regular transmissions of the SFN counter value are inefficient and consume a large portion of a systems' capacity. The present systems and methods detect the occurrence of a specific timing (such as a SFN). A SFN may be detected when one or more synchronization channels have been shifted. In other words, the synchronization channels are shifted such that they don't repeat every 5 ms within a frame 1300. Further, the present systems and methods describe a receiver structure and a set of detection methods for detecting synchronization signals.

FIG. 1 illustrates an exemplary wireless communication system 100 in which embodiments may be practiced. A base station 102 is in wireless communication with a plurality of user devices 104 (which may also be referred to as mobile stations, user equipment, subscriber units, access terminals, terminals, etc.). A first user device 104a, a second user device 104b, and an Nth user device 104n are shown in FIG. 1. The base station 102 transmits data to the user devices 104 over a radio frequency (RF) communication channel 106. The transmitted data may include a plurality of LTE frames. Each of the LTE frames may include a length of 10 ms.

FIG. 2 is illustrates one embodiment of a synchronization channel (SCH) 200. As previously explained, the SCH 200 includes a P-SCH symbol 202 and an S-SCH 204 symbol. Cell identification 208 may be encoded within the S-SCH 204 symbol as one part of the SCH 200. The identification 208 may provide a unique identification for a base station that is transmitting the SCH 200. The identification 208 may also include an indication of particular sectors the base station transmits/receives data to/from a mobile station. In another embodiment, the P-SCH symbol 202 may include another encoded cell identification in addition to the S-SCH symbol 204. For example, three sectors in LTE provide a sector-identification.

FIG. 3 is a block diagram further illustrating an exemplary wireless communication system 300. A base station 302 is in wireless communication with a mobile station 312. The base station 302 may include a plurality of frames 304. The plurality of frames 304 may be LTE frames that have a length of 10 ms. Each of the plurality of frames 304 may include one or more channels, such as the SCH 200.

The base station 302 may also include a channel shifter 306. The shifter 306 may shift the location of one or more channels included in the frame 304. For example, a frame 304 may include a plurality of SCH channels 200 where each SCH channel repeats every 5 ms. The channel 200 may repeat within a single frame or across multiple frames. The channel shifter 306 may shift the channel 200 such that subsequent occurrences of the channel 200 repeat less than or greater than 5 ms after the previous occurrence of the channel 200. In one embodiment, the channel shifter 306 shifts the position of the channel 200 in order to indicate an event. An event may identify the boundaries of a Superframe. For example, the Superframe may include 4096 LTE frames 304. As such, the one or more SCH channels 200 within the $4096^{th}$ frame may be shifted to indicate the end of a first Superframe and the beginning of a second Superframe. The base station 302 may further include cell identification 308. The identification 308 may uniquely identify the base station 302 from other base stations. In one embodiment, the cell identification 308 is encoded as part of the S-SCH symbol 204 within the SCH channel 200. The base station 302 transmits each of the plurality of frames 304 to the mobile station 312 over a radio frequency (RF) communication channel 310. In another embodiment, the P-SCH symbol 202 may include another encoded cell identification in addition to the S-SCH symbol 204. For example, three sectors in LTE provide a sector-identification.

The mobile station 312 may include a frame receiver 314 that receives each of the plurality of frames 304. The mobile station 312 may also include an event identifier 316. The event identifier 316 may determine if a received frame indicates the occurrence an event. For example, the event identifier 316 determines whether the position of the SCH channel 200 within the received frame has been shifted. The mobile station 312 further includes a correlation comparator 318. The comparator 318 may compare the correlation between a received signal and a known sequence (such as a subframe 1304, a cell identification 308 encoded within the S-SCH symbol 204, or the SCH 200 or the P-SCH symbol 202) transmitted from the base station 302. In one embodiment, the signal includes the known sequence. The mobile station 312 may be aware of the timing of the subframe 1304 sent from the base station 302. The subframe 1304 may include one or more SCH channels 200. The mobile station 312 also includes a decoder 320 which may decode the cell identification 308 encoded within the S-SCH symbol 204.

FIG. 4 illustrates several embodiments 400 of one or more frames 1300 that include a plurality of SCH channels 200. An embodiment of a 10 ms structure 408 includes two SCH channels. Only one frame 1300 is illustrated in the 10 ms structure 408, however more than one frame 1300 may be included with the structure 408. A first SCH channel includes a first P-SCH, S-SCH pair 416a, 418a. A second SCH channel 420 includes a second P-SCH, S-SCH pair 416b, 418b. In one embodiment, the second SCH channel 420 is a repetition of the first SCH channel. The second SCH channel 420 may be positioned 5 ms after the first SCH channel. A third SCH channel 422 includes a third P-SCH, S-SCH pair 416c, 418c. The third SCH channel 422 may also be a repetition of the first SCH channel and the second SCH channel 420. In one embodiment, the third SCH channel 422 is positioned 5 ms after the occurrence of the second SCH channel 420. The description of the remaining structures 410, 412, 414 will base the position of the SCH channels from the 10 ms structure 408.

An X-Y structure 410 is illustrated. The illustrated X-Y structure 410 includes one frame 1300, however it is to be understood that more than one frame 1300 could be included in the X-Y structure 410. For purposes of illustration, positions a1 . . . an indicate the position of a SCH channel. Positions b1 . . . bn indicate the beginning of a half-frame that is 5 ms. The structure 410 illustrates the shift in position of the second SCH channel 420. For example, the second SCH channel 420 is shifted to a position a2 within the structure 410. The position a2 occurs less than 5 ms after a position a1, which is the position of the first SCH channel. The first and third SCH channels remain in the same position from the 5 ms structure 408 to the X-Y structure 410. However, the third SCH channel 422 occurs at a position a3 which coincides with a position b3. The distance from the position a2 to the position a3 is greater than 5 ms. For purposes of illustration, "X Sec" indicates less than 5 ms while "Y Sec" indicates greater than 5 ms.

An X-X-Y structure 412 is also illustrated. The X-X-Y structure 412 includes two frames 1300. However, it is to be understood that more than two frames 1300 may be included in the X-X-Y structure 412. As shown, the second SCH channel 420 has been shifted from the previous position in the 5 ms structure 408 to the position a2. Similarly, the third SCH channel 422 has been shifted to the position a3. In other words, in the X-X-Y structure 412, the second SCH channel 420 occurs less than 5 ms after the first SCH channel and the third SCH channel 422 occurs less than 5 ms after the second SCH channel 420. A fourth SCH channel 424 includes a fourth P-SCH, S-SCH pair 416d, 418d. The fourth SCH channel 424 occurs more than 5 ms after the occurrence of the third SCH channel 422.

An X-X-X-Y structure 414 is also illustrated. The X-X-X-Y structure 414 includes three frames 1300. However, it is to be understood that more than three frames 1300 may be included in the X-X-X-Y structure 414. As shown, the second SCH channel 420 has been shifted from the previous position in the 5 ms structure 408 to the position a2. Similarly, the third SCH channel 422 has been shifted to the position a3. Further, the fourth SCH channel 424 has also been shifted from its previous position to a position a4. In other words, in the X-X-X-Y structure 414, the second SCH channel 420 occurs less than 5 ms after the first SCH channel, the third SCH channel 422 occurs less than 5 ms after the second SCH channel 420 and the fourth SCH channel 424 occurs less than 5 ms after the occurrence of the third SCH channel 422. A fifth SCH channel 426 is illustrated that includes a fifth P-SCH, S-SCH pair 416e, 418e. In one embodiment, the fifth SCH channel 426 occurs more than 5 ms after the occurrence of the fourth SCH channel 424.

Figure 5:
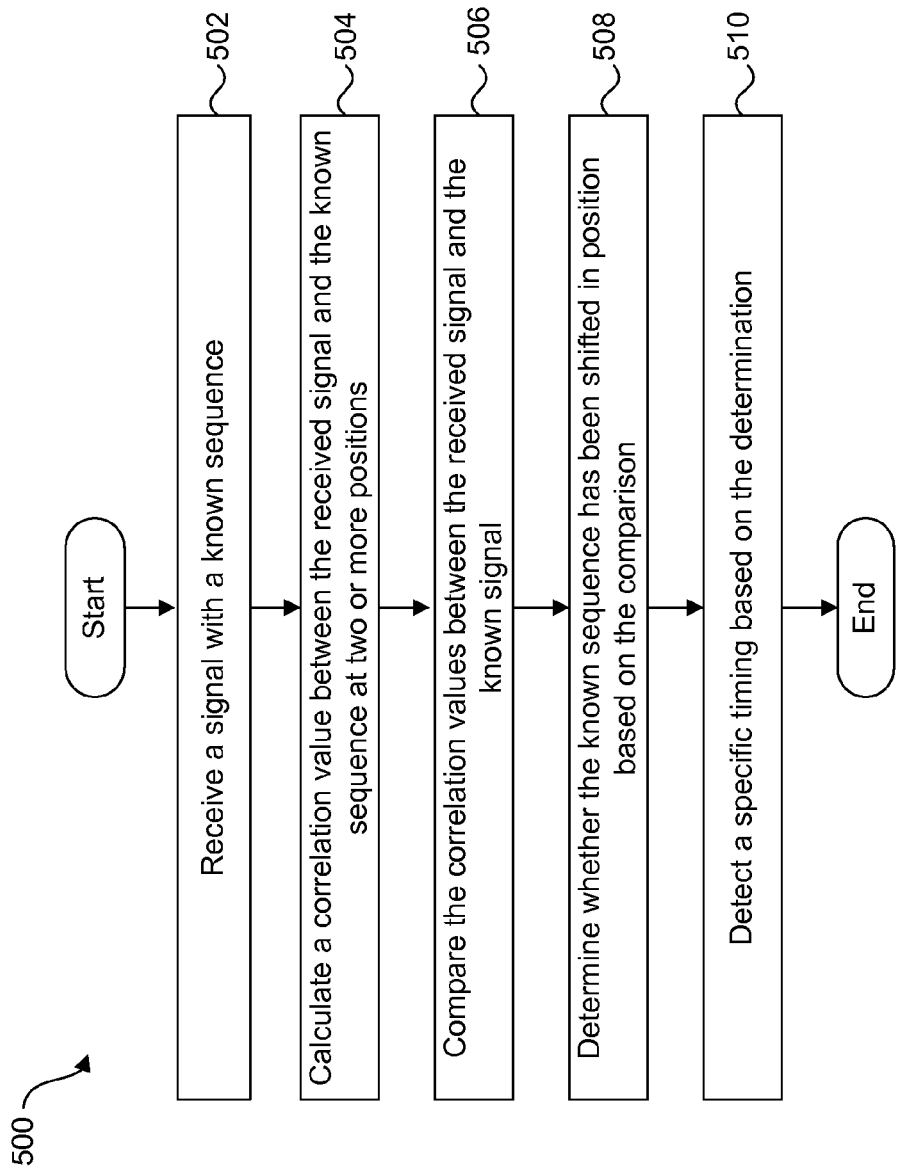
FIG. 5 is a flow diagram illustrating one embodiment of a method for detecting a specific timing from the position of one or more SCH channels.

FIG. 5 is a flow diagram illustrating one embodiment of a method 500 for detecting a specific timing (i.e., a SFN-boundary) from the position of one or more SCH channels 200 using correlation. The position of a SCH channel 200 may be shifted in order to provide the detection of the specific timing. The method 500 facilitates detecting the position of one or more SCH channels 200 between consecutive occurrences. For example, in a single 10 ms LTE frame 1300, there are two half-frames of 5 ms each and a SCH channel 200 may be repeated every 5 ms within the 10 ms LTE frame 1300. The method 500 may detect the shift of the position of SCH channels 200 such that in the first half frame, the channel 200 may be in a different position than in the second half frame of the same 10 ms LTE frame 1300. In one embodiment, the method 500 is implemented by a mobile station 312.

A signal with a known sequence may be received 502. The signal may be any type of communications signal associated with TDMA, OFDM, WCDMA or any other type of communications standard. The known sequence may include the P-SCH sequence 202 included in the SCH channel 200. In one embodiment, the mobile station 312 that receives 502 the signal is aware of the timing of the SCH channel 200 through the P-SCH sequence 202. For example, the P-SCH sequence 202 is used to detect/establish the general timing of the frame and the unshifted SCH positions within the frame. The mobile station 312 may become aware of the timing via a prior cell-search and timing detection process using the P-SCH sequence 202. A correlation value may be calculated 504 using the P-SCH sequence 202, the S-SCH sequence 204 or both sequences. In other words, both the P-SCH 202 and the S-SCH 204 may be used for position-shift detection after the timing has been detected using only the P-SCH 202. The correlation value may indicate the correlation between the received signal and the known sequence at two or more positions. For example, a first correlation value may be calculated 504 at the position a2 and a second correlation value may be calculated 504 at the position b2. These two correlation values may then be compared 506. Based on the comparison, a determination 508 is made whether or not the known sequence has been shifted in position. A specific timing may be detected 510 based on the determination. In one embodiment, if the known sequence has been shifted, a specific timing is detected 510.

Figure 6:
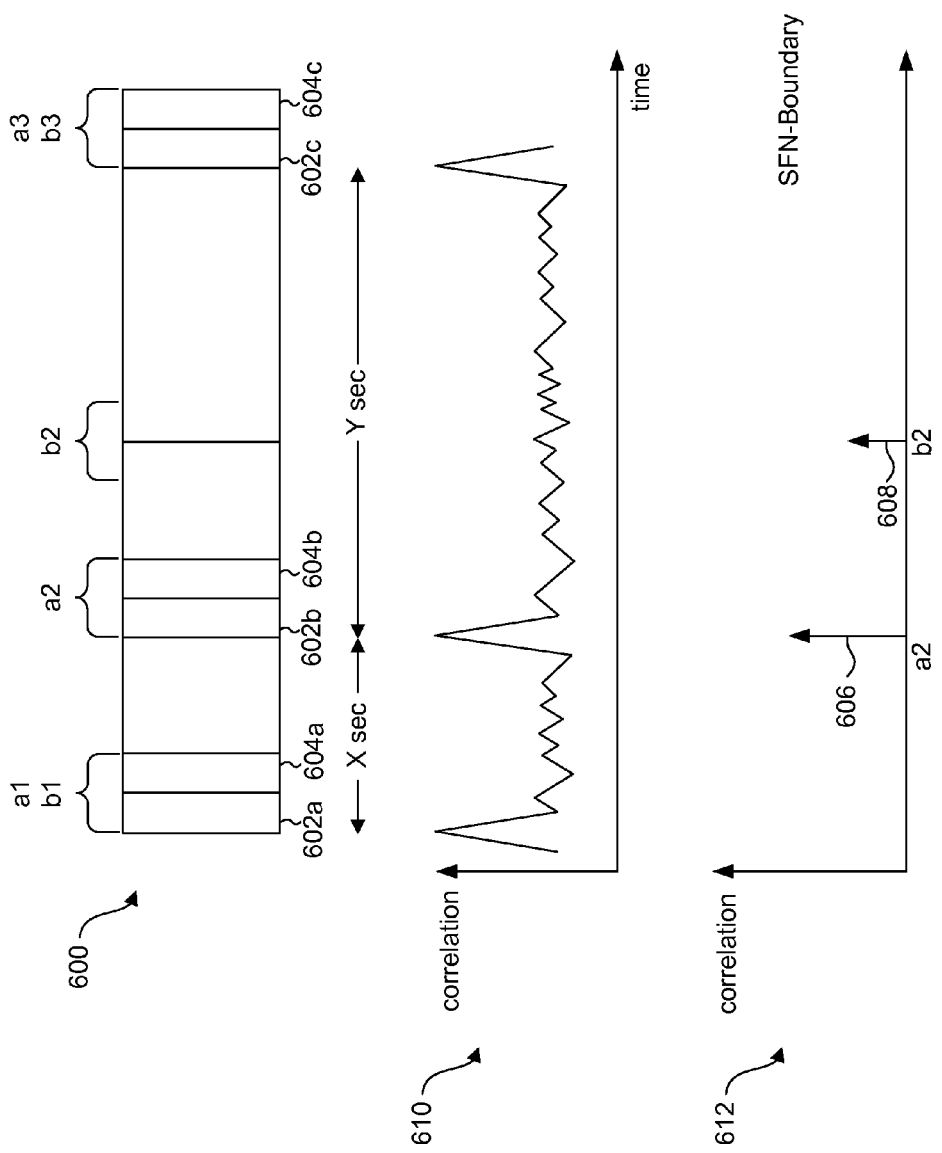
FIG. 6 is an embodiment of an X-Y structure of the radio frame.

FIG. 6 is a further embodiment of an X-Y structure 600. As shown, a second SCH channel with a second P-SCH, S-SCH pair 602b, 604b is shifted from a position b2 to a position a2. A correlation chart 610 illustrates the correlation between a received signal and a known sequence. In one embodiment, the known sequence is the P-SCH 602 (or the S-SCH or both) within a SCH channel. There may be a high correlation at each occurrence of the P-SCH 602 as shown on the chart 610. A specific timing chart 612 may be used to illustrate the difference in correlation at the position a2 and the point b2. A first correlation value 606 at the position a2 is greater than a second correlation value 608 at the position b2. A greater correlation value at the position a2 may indicate a specific timing (i.e., a SFN-Boundary).

Figure 7:
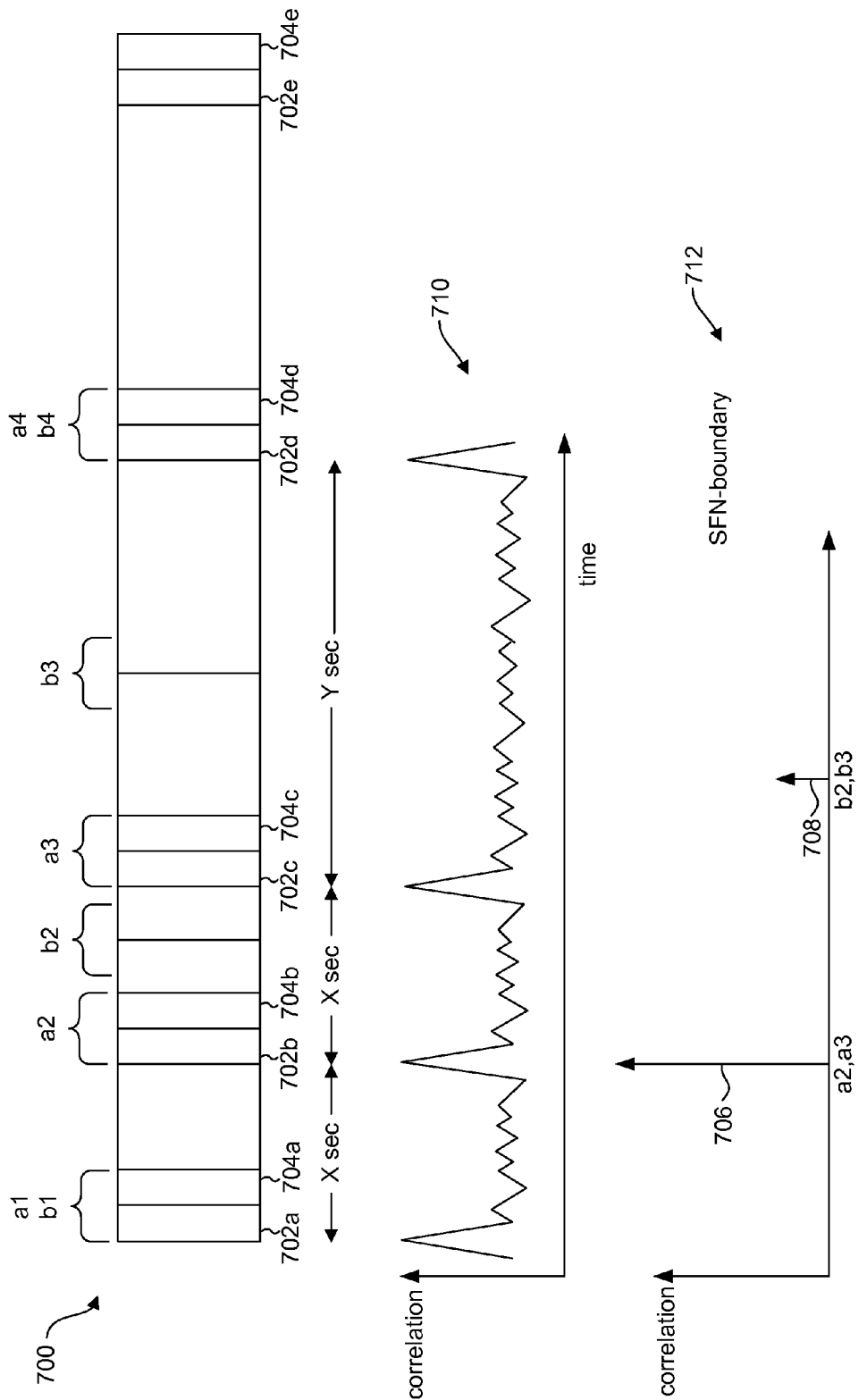
FIG. 7 is an embodiment of an X-X-Y structure of the radio frame.

FIG. 7 is a further embodiment of an X-X-Y structure 700. As shown, a second SCH channel with a second P-SCH, S-SCH pair 702b, 704b is shifted from a position b2 to a position a2. The structure 700 also includes a third SCH channel with a third P-SCH, S-SCH pair 702c, 704c shifted from a position b3 to a position a3. A correlation chart 710 illustrates the correlation between a received signal and a known sequence. As previously explained, the known sequence may be the P-SCH 702 (or the S-SCH or both) within a SCH channel. As shown by the chart 710, a high correlation exists at each occurrence of the P-SCH 702. A specific timing chart 712 illustrates the accumulated correlation between the signal and the known sequence at two or more positions. For example, the timing chart 712 illustrates a first accumulated correlation value 706 and a second accumulated correlation value 708. The first accumulated correlation value 706 may be the combined correlation values at position a2 and position a3. The second accumulated correlation value 708 may be the combined correlation values at position b2 and position b3. In one embodiment, if the first accumulated correlation value 706 at positions a2 and a3 is greater than the second accumulated correlation value 708, a specific timing is detected. In other words, a mobile station may detect the beginning or end of an SFN.

Figure 8:
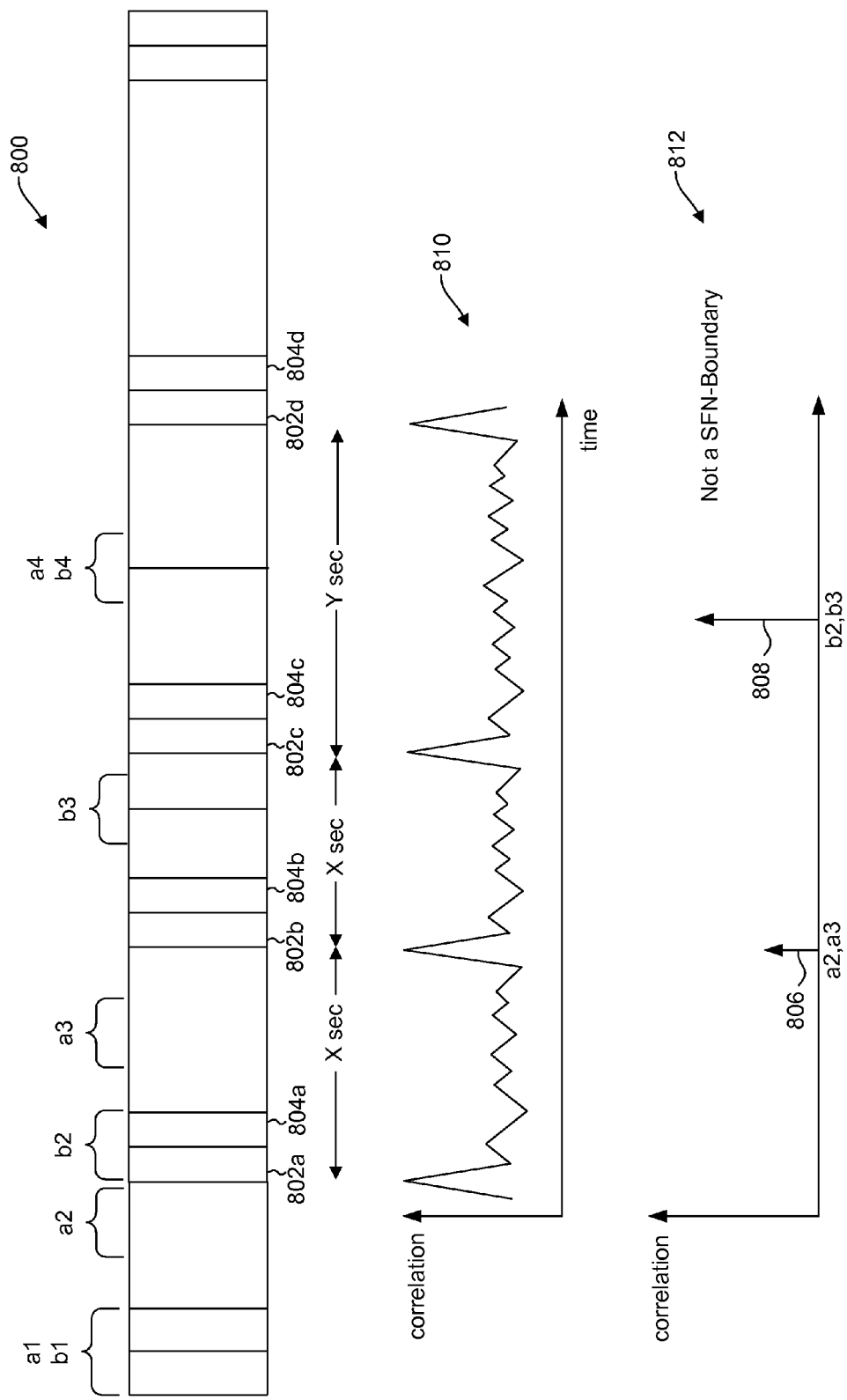
FIG. 8 is an embodiment of an adjusted X-X-Y structure of the radio frame.

FIG. 8 shows how the method 500 works for the normal situation when the SCH positions are not indicating an SFN boundary or event. FIG. 8 shows an adjusted X-X-Y structure 800. In one embodiment, the adjusted structure 800 is identical to the X-X-Y structure 700, however, the adjusted structure 800 has been time shifted. For example, the adjusted structure 800 may be time shifted by 5 ms. As such, the positions a2, a3 and a4 do not include an occurrence of the known sequence (i.e., the P-SCH sequence 802 or the S-SCH sequence 804). Instead, an occurrence of a P-SCH sequence 802a (or a S-SCH sequence 804a) occurs at a position b2. A correlation chart 810 illustrates a high correlation at each occurrence of the P-SCH sequence 802 or the S-SCH sequence 804. However, an adjusted specific timing chart 812 illustrates a first accumulated correlation value 806 at positions a2 and a3 that is less than a second accumulated value 808 at positions b2 and b3. In one embodiment, if the second accumulated correlation value 808 is greater than the first accumulated correlation value 806, a specific timing is not detected. In other words, the boundaries of an SFN are not detected.

Figure 9:
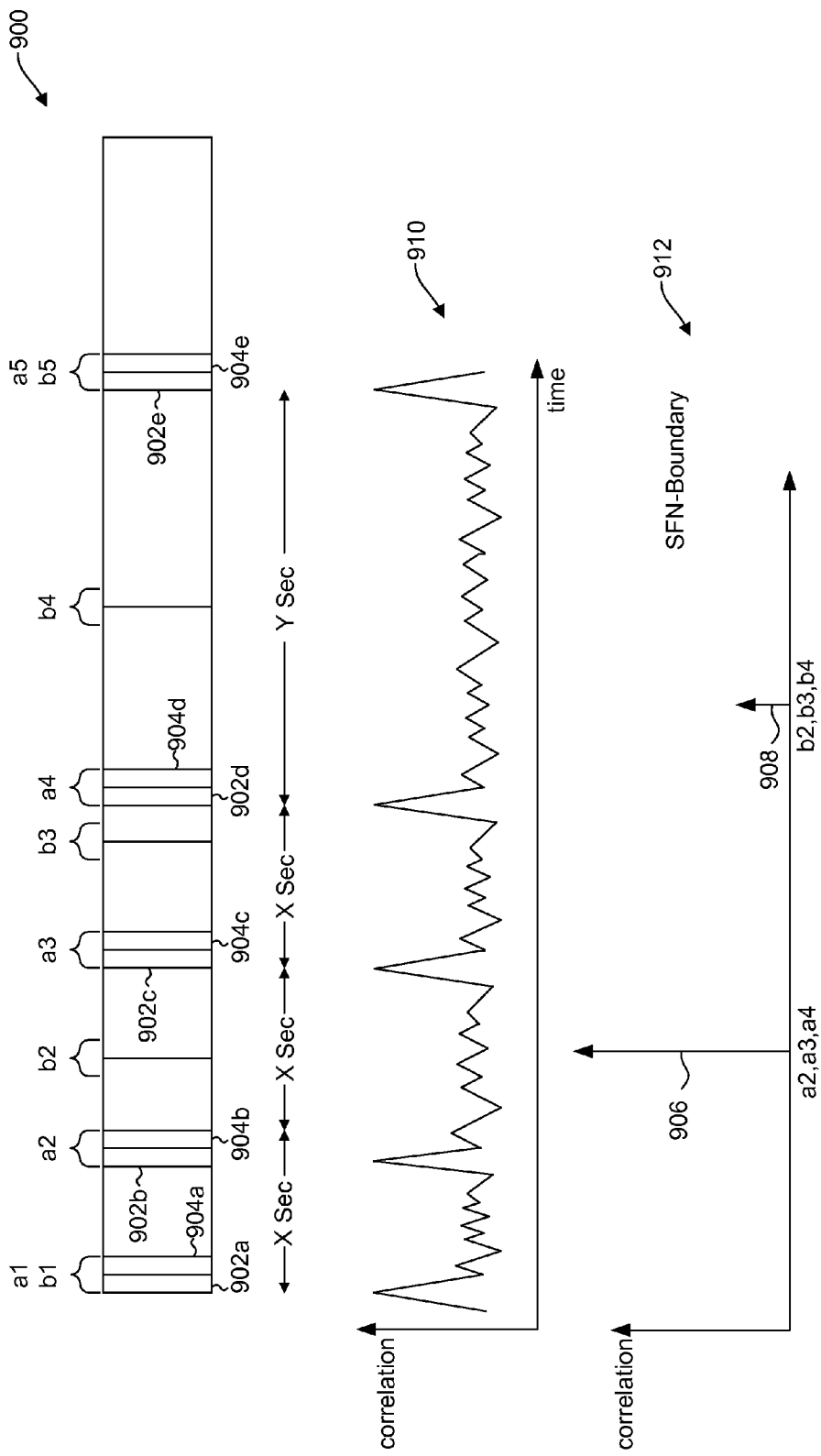
FIG. 9 is an embodiment of an X-X-X-Y structure of the radio frame.

FIG. 9 is a further embodiment of an X-X-X-Y structure 900. As shown, a second SCH channel with a second P-SCH, S-SCH pair 902b, 904b is shifted from a position b2 to a position a2. The structure 900 also includes a third SCH channel with a third P-SCH, S-SCH pair 902c, 904c shifted from a position b3 to a position a3. In addition, the structure 900 also includes a fourth SCH channel with a fourth P-SCH, S-SCH pair 902d, 904d shifted from a position b4 to a position a4. A correlation chart 910 illustrates the correlation between a received signal and a known sequence. As previously explained, the known sequence may be the P-SCH 902 within a SCH channel. As shown by the chart 910, a high correlation exists at each occurrence of the P-SCH 902 (or S-SCH or both). A specific timing chart 912 illustrates the accumulated correlation between the signal and the known sequence at two or more positions. For example, the timing chart 912 illustrates a first accumulated correlation value 906 and a second accumulated correlation value 906. The first accumulated correlation value 906 may be the combined correlation values at positions a2, a3 and a4. The second accumulated correlation value 908 may be the combined correlation values at positions b2, b3 and b4. In one embodiment, if the first accumulated correlation value 906 at positions a2, a3 and a4 is greater than the second accumulated correlation value 908, a specific timing is detected. In other words, a mobile station may detect the beginning or end of an SFN.

Figure 10:
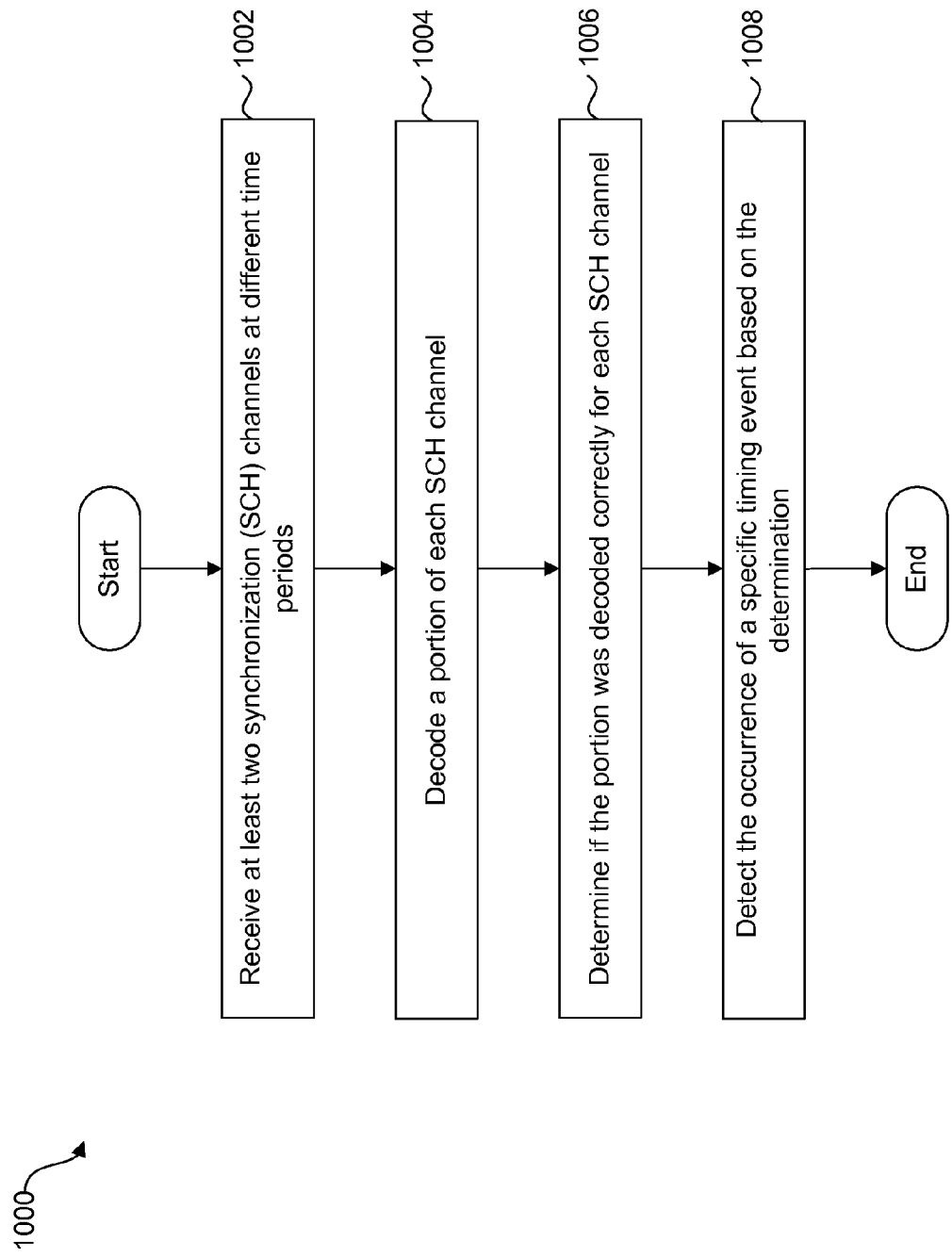
FIG. 10 is a flow diagram illustrating one embodiment of a method for detecting a specific timing by decoding cell identification.

FIG. 10 is a flow diagram illustrating one embodiment of a method 1000 for detecting a specific timing by only using the decoding process of the cell identification 208 encoded within the S-SCH, without the need to use the correlation of the method 500 of FIG. 5. The method 1000 may be implemented by a mobile station 312. In one embodiment, at least two S-SCH channels are received 1002 at different time periods. For example, a first S-SCH channel may be received at a position a2 and a second S-SCH channel may be subsequently received at a position b2. The method 1000 may be implemented for more than two S-SCH channels received at more than two different time periods. In one embodiment, the S-SCH sequence of each S-SCH channel is decoded 1004. An encoded cell identification 208 part is decoded from each S-SCH sequence 204. A determination 1006 is made whether or not the cell identification part of each S-SCH sequence 204 was decoded correctly. In other words, it is determined 1006 if a cell identification 208 is decoded from each S-SCH sequence 204. The occurrence of a specific timing event is detected 1008 based on the determination 1006. For example, if a cell identification 208 is decoded 1004 correctly at the position a2, the occurrence of a specific timing event may be detected 1008.

In another embodiment of the method 1000 illustrated in FIG. 10, the P-SCH symbol 202 may include another encoded cell identification in addition to the S-SCH symbol 204. For example, three sectors in LTE provide a sector-identification. In another embodiment of the method 1000 depicted in FIG. 10, an encoded sector identification part may be decoded from each P-SCH sequence 202. A determination 1006 is made whether the sector identification part of each P-SCH sequence 202 was decoded correctly. In other words, it is determined 1006 whether a sector identification is decoded from each P-SCH sequence 202.

In one embodiment, the method 500 illustrated in FIG. 5 may be combined with the method 1000 illustrated in FIG. 10. For example, the method 500 in FIG. 5 may detect the occurrence of a specific timing event such as the boundary of an SFN, and the method 1000 of FIG. 10 may clarify the SFN boundary.

Figure 11:
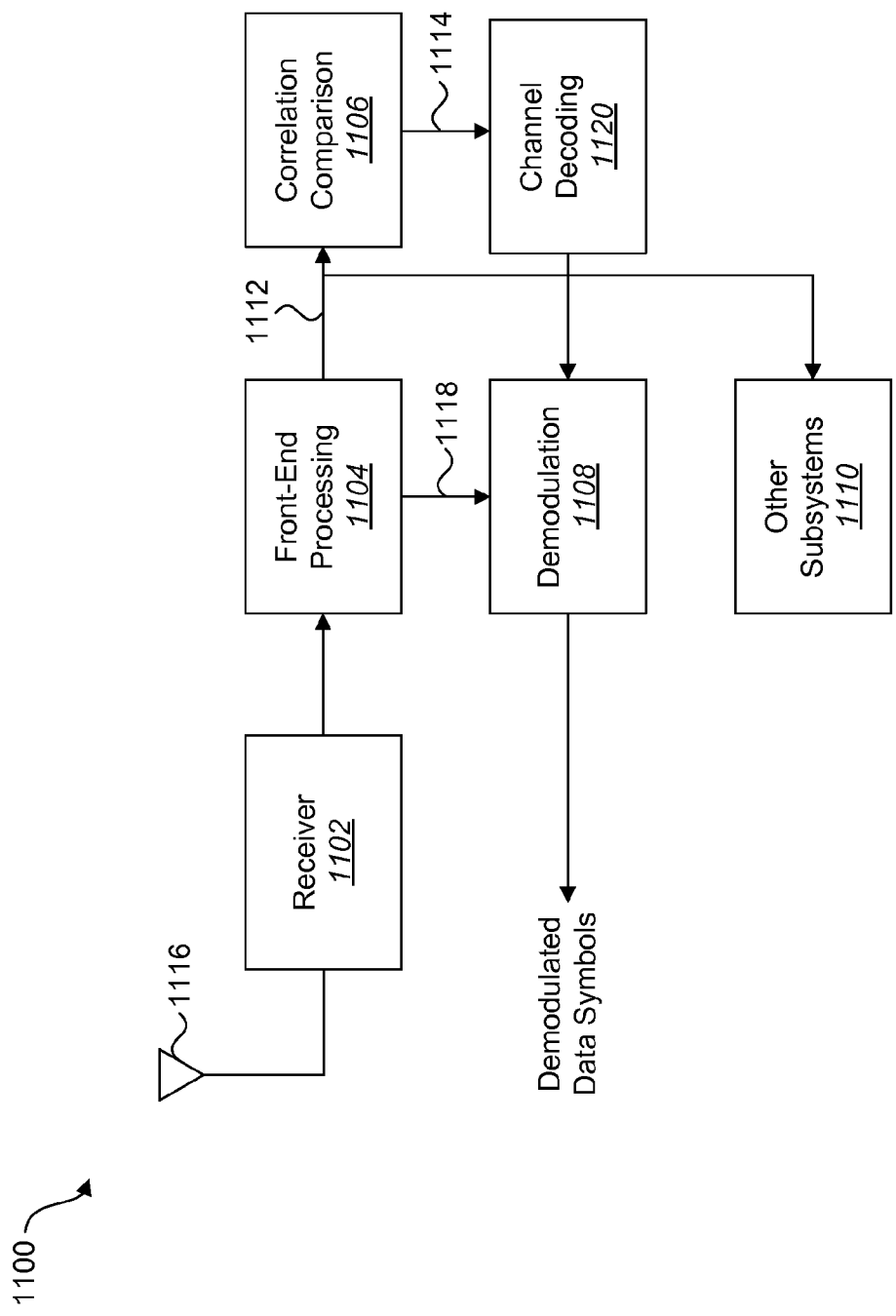
FIG. 11 illustrates a block diagram of certain components associated with an embodiment of a receiver.

FIG. 11 illustrates a block diagram 1100 of certain components associated with an embodiment of a receiver 1102. Other components that are typically associated with the receiver 1102 may not be illustrated for the purpose of focusing on the novel features of the embodiments herein.

A signal with a known sequence may be received at an antenna 1116. In one embodiment, the signal includes data within the plurality of frames 304 sent from the transmitter, base station, etc. The signal is provided by the antenna 1116 to the receiver 1102. The receiver 1102 down-converts the signal and provides it to a front-end processing component 1104. The front-end processing component 1104 may determine whether one of the plurality of frames 304 indicates the occurrence of a specific timing. The front-end processing component 1104 may provide the received signal 1112 to a correlation comparison component 1106. The comparison component 1106 may compare the correlation between the signal and the known reference at two or more positions. The received signal 1112 typically includes noise and usually suffers from fading. The front-end processing component 1104 may also provide the data 1118 to a demodulation component 1108 that demodulates the signal and other subsystems 1110 that further process the received signal 1112. The correlation comparison component 1106 may provide the signal with the known sequence as well as a comparison of correlation values 1114 to a channel decoding component 1120. The decoding component 1120 may decode portions of the known sequence in order to decode cell identification 208.

Figure 12:
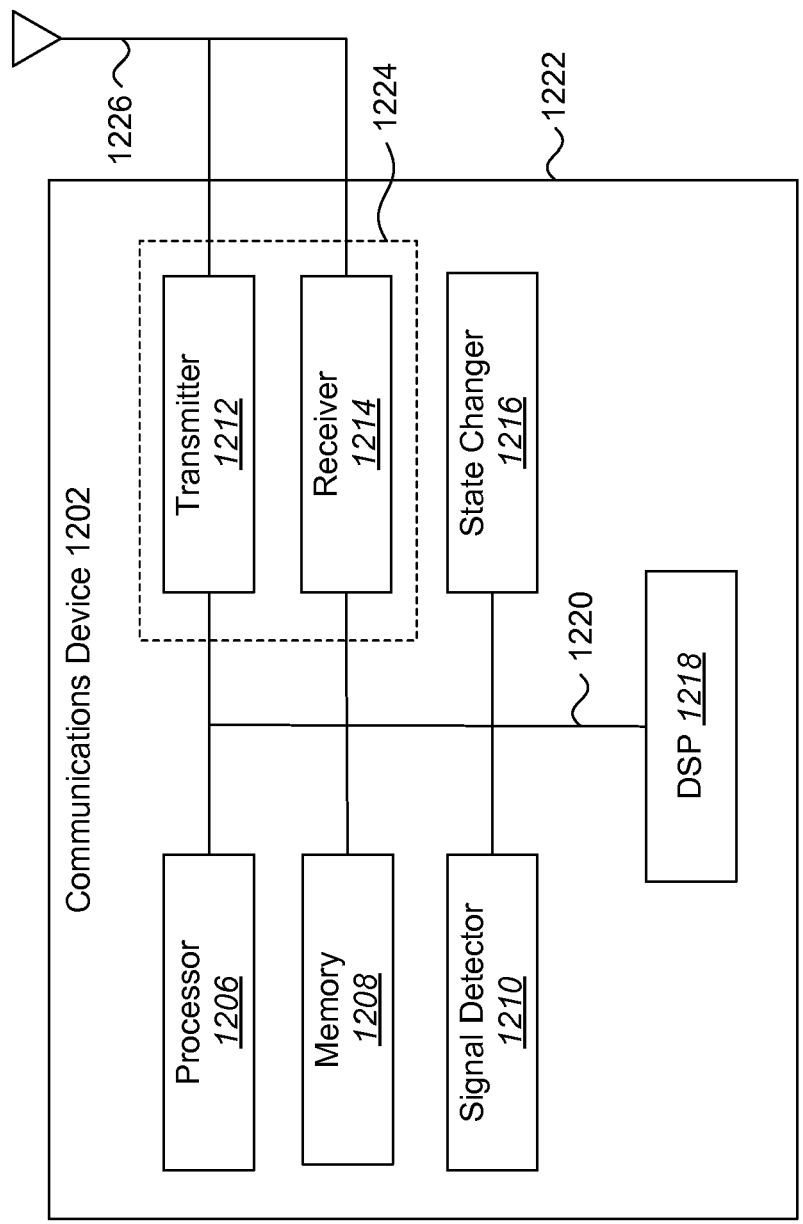
FIG. 12 illustrates various components that may be utilized in a communications device.

FIG. 12 illustrates various components that may be utilized in a communications device 1202. The device 1202 may include a mobile station, base station, etc. The device 1202 includes a processor 1206 which controls operation of the communications device 1202. The processor 1206 may also be referred to as a CPU. Memory 1208, which may include both read-only memory (ROM) and random access memory (RAM), provides instructions and data to the processor 1206. A portion of the memory 1208 may also include non-volatile random access memory (NVRAM).

The communications device 1202 may also include a housing 1222 that contains a transmitter 1212 and a receiver 1214 to allow transmission and reception of data. The transmitter 1212 and receiver 1214 may be combined into a transceiver 1224. An antenna 1226 is attached to the housing 1222 and electrically coupled to the transceiver 1224. Additional antennas (not shown) may also be used.

The device 1202 may also include a signal detector 1210 used to detect and quantify the level of signals received by the transceiver 1224. The signal detector 1210 detects such signals as total energy, pilot energy per pseudonoise (PN) chips, power spectral density, and other signals.

A state changer 1216 controls the state of the device 1202 based on a current state and additional signals received by the transceiver 1224 and detected by the signal detector 1210. The communications device 1202 may be capable of operating in any one of a number of states.

The various components of the device 1202 are coupled together by a bus system 1220 which may include a power bus, a control signal bus, and a status signal bus in addition to a data bus. However, for the sake of clarity, the various buses are illustrated in FIG. 12 as the bus system 1220. The device 1202 may also include a digital signal processor (DSP) 1218 for use in processing signals. The communications device illustrated in FIG. 12 is a functional block diagram rather than a listing of specific components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for detecting a specific timing from a synchronization channel, the method comprising:
   receiving a signal with a known sequence, wherein a timing of the known sequence is determined before the known sequence is received;
   calculating two or more correlation values between the received signal and the known sequence at two or more positions;
   comparing the two or more correlation values;
   determining by a processor whether a position of the known sequence has been shifted from the determined timing based on the comparison; and
   detecting by the processor a specific timing from a synchronization channel based on the determination, wherein the specific timing is a superframe boundary.

2. The method of claim 1, wherein the known sequence is a primary-synchronization sequence within a synchronization channel.

3. The method of claim 1, wherein the known sequence is a secondary-synchronization sequence within a synchronization channel.

4. The method of claim 1, wherein the timing of the known sequence is determined through a prior cell-search.

5. The method of claim 1, further comprising receiving a radio frame with the signal and the known sequence.

6. The method of claim 1, wherein the superframe comprises 4096 radio frames.

7. A device configured to detect a specific timing from a synchronization channel, the device comprising:
   a processor;
   memory in electronic communication with the processor;
   instructions stored in the memory, the instructions being executable to:
      receive a signal with a known sequence, wherein a timing of the known sequence is determined before the known sequence is received;
      calculate two or more correlation values between the received signal and the known sequence at two or more positions;
      compare the two or more correlation values;
      determine whether a position of the known sequence has been shifted from the determined timing based on the comparison; and
      detect a specific timing from a synchronization channel based on the determination, wherein the specific timing is a superframe boundary.

8. The device of claim 7, wherein the known sequence is a primary-synchronization sequence within a synchronization channel.

9. The device of claim 7, wherein the known sequence is a secondary-synchronization sequence within a synchronization channel.

10. The device of claim 7, wherein the device is a mobile communications device.

11. A non-transitory computer-readable medium comprising executable instructions for detecting a specific timing from a synchronization channel, the instructions being executable to:
   receive a signal with a known sequence, wherein the timing of the known sequence is determined before the known sequence is received;
   calculate two or more correlation values between the received signal and the known sequence at two or more positions;
   compare the two or more correlation values;
   determine whether a position of the known sequence has been shifted from the determined timing based on the comparison; and
   detect a specific timing from a synchronization channel based on the determination, wherein the specific timing is a superframe boundary.

* * * * *